United States Patent
Miessmer

(10) Patent No.: US 11,920,712 B2
(45) Date of Patent: Mar. 5, 2024

(54) SHRINK-FIT COLLAR

(71) Applicant: Oetiker Schweiz AG, Horgen (CH)

(72) Inventor: Stefan Miessmer, Zurich (CH)

(73) Assignee: Oetiker Schweiz AG, Horgen (CH)

( * ) Notice: Subject to any disclaimer, the term of this patent is extended or adjusted under 35 U.S.C. 154(b) by 405 days.

(21) Appl. No.: 17/287,811

(22) PCT Filed: Nov. 6, 2019

(86) PCT No.: PCT/EP2019/080440
§ 371 (c)(1),
(2) Date: Apr. 22, 2021

(87) PCT Pub. No.: WO2020/094740
PCT Pub. Date: May 14, 2020

(65) Prior Publication Data
US 2021/0381630 A1    Dec. 9, 2021

(30) Foreign Application Priority Data
Nov. 7, 2018    (WO) .................. PCT/EP2018/080452

(51) Int. Cl.
*F16L 33/207*    (2006.01)

(52) U.S. Cl.
CPC ................................. *F16L 33/2076* (2013.01)

(58) Field of Classification Search
CPC ................................................... F16L 33/2076
See application file for complete search history.

(56) References Cited

U.S. PATENT DOCUMENTS

| | | | |
|---|---|---|---|
| 5,868,435 A | 2/1999 | Bartholomew | |
| 10,005,600 B2 * | 6/2018 | Nakamura | .............. F16L 33/03 |
| 2005/0138778 A1 * | 6/2005 | Oetiker | ..................... B25B 7/02 |
| | | | 24/20 R |

FOREIGN PATENT DOCUMENTS

| | | | | |
|---|---|---|---|---|
| DE | 102007008274 A1 * | 8/2008 | .......... | F16L 33/2071 |
| DE | 102007035930 A1 * | 2/2009 | .......... | F16L 33/2071 |
| EP | 0122329 A1 | 10/1984 | | |
| EP | 0728979 A1 | 8/1996 | | |

(Continued)

OTHER PUBLICATIONS

International Search Report Form PCT/ISA/210, and Written Opinion Form PCT/ISA/237, International Application No. PCT/EP2019/080440, pp. 1-14 International Filing Date Nov. 6, 2019 search report dated Jan. 24, 2020.

(Continued)

*Primary Examiner* — Robert Sandy
(74) *Attorney, Agent, or Firm* — David L. Nocilly; Bond, Schoeneck & King PLLC

(57) ABSTRACT

A shrink-fit ring, the two circumferential edges (10) of which are flanged, makes it possible to use thinner band thicknesses without the risk of buckling owing to its greater intrinsic strength. The circumferential edges (10) end in limbs (16) which point radially outwards and enclose an angle of approx. 70° to 90° with an unflanged centre portion (13) of the ring that is located axially further inwards. The flanging results in an extension of the diameter of the ring edges, wherein the ring edge regions (14) are bent outwards in a rounded manner and the edge surfaces (11) run at an angle of preferably approx. 0° to approx. 20° with respect to the ring axis (12).

7 Claims, 2 Drawing Sheets

(56) References Cited

FOREIGN PATENT DOCUMENTS

EP  1243836 A1  9/2002
WO  9939123 A1  8/1999

OTHER PUBLICATIONS

Translated International Search Report, of PCT/EP2019/080440, dated Jan. 24, 2020.

* cited by examiner

SHRINK-FIT COLLAR

CROSS-REFERENCE TO RELATED APPLICATIONS

The present application is a US national phase of PCT Application No. PCT/EP2019/080440, filed on Nov. 6, 2019, which claims priority to PCT Application No. PCT/EP2018/080452, filed Nov. 7, 2018, the disclosures of both of which are incorporated herein by reference in their entireties.

PRIOR ART

So-called multi-crimp or shrink-fit rings or collars are produced in different designs. In a conventional manufacturing process, a tube welded axially or along a helix is cut into rings of the desired width. Alternatively, a band whose length corresponds to the circumference of the ring is cut straight or diagonally from a strip that has been split according to the desired ring width, then the band is rounded to form the ring and the two band ends are butt-welded together.

For shrinking, the ring or collar is compressed by means of a tool with several pressing jaws acting radially inwards. During this shrinking process, also known as multi-crimping, there is a risk of the ring buckling if the band is not thick enough.

A shrink-fit ring of this generic type is described in DE 10 2007 008 274 A1. The ring described therein is compressed onto a hose by radial multi-crimping in the area of overlap with a pipe. In cross-section, it has a structure that is curved twice radially inwards, whereby the radially inner sections are rounded to protect the hose.

SUMMARY OF THE INVENTION

As a general object, the invention aims to at least partially overcome the disadvantages that occur with known shrink-fit rings. A more specific object can be seen in the provision of a shrink-fit ring which allows the use of smaller band thicknesses for achieving a given strength.

This object is met by bending the ring outwards at both axial circumferential edges by an angle of 70° to 90°. This shaping, which is preferably achieved by flanging or other bending or folding processes, increases the intrinsic rigidity of the ring according to the principle of a stiffening corrugation or an I-beam, so that buckling of the ring during the shrinking process can be avoided even with smaller band thicknesses.

The forming causes an increase in the diameter of the band edges, whereby the band edges are rounded and bent outwards. This prevents damage to the hose material enclosed by the ring.

DRAWINGS

Figure 1:
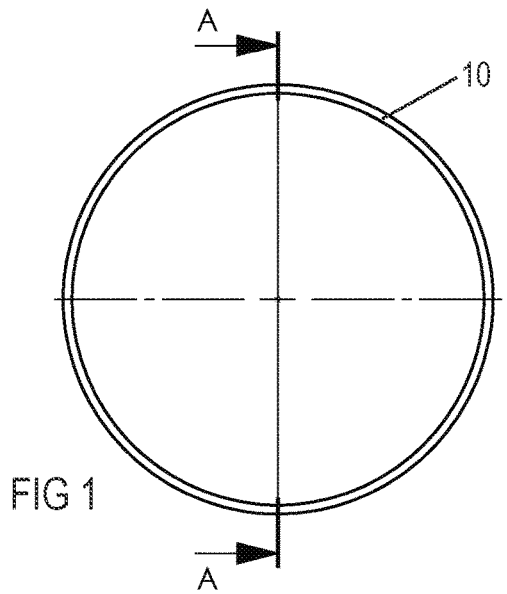
Figure 2:
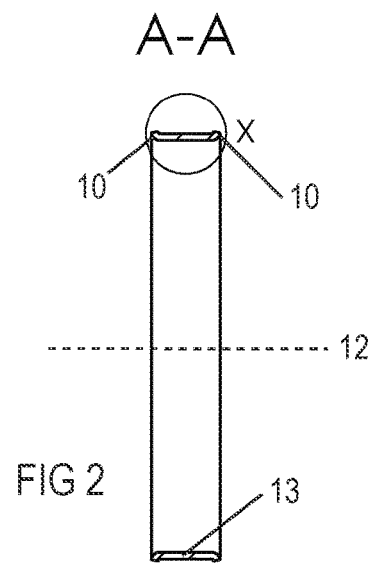
Figure 4:
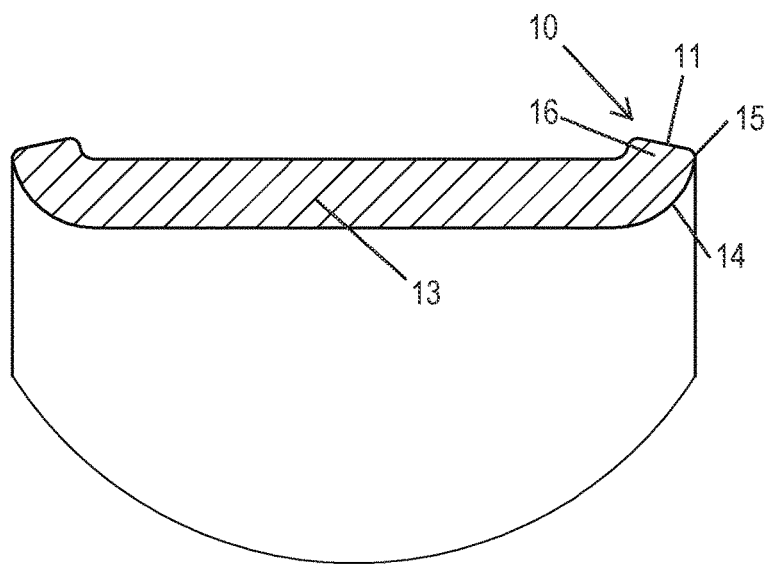
Figure 3:
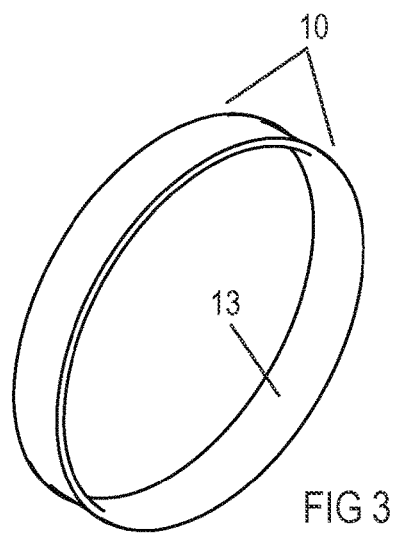
Figure 5:
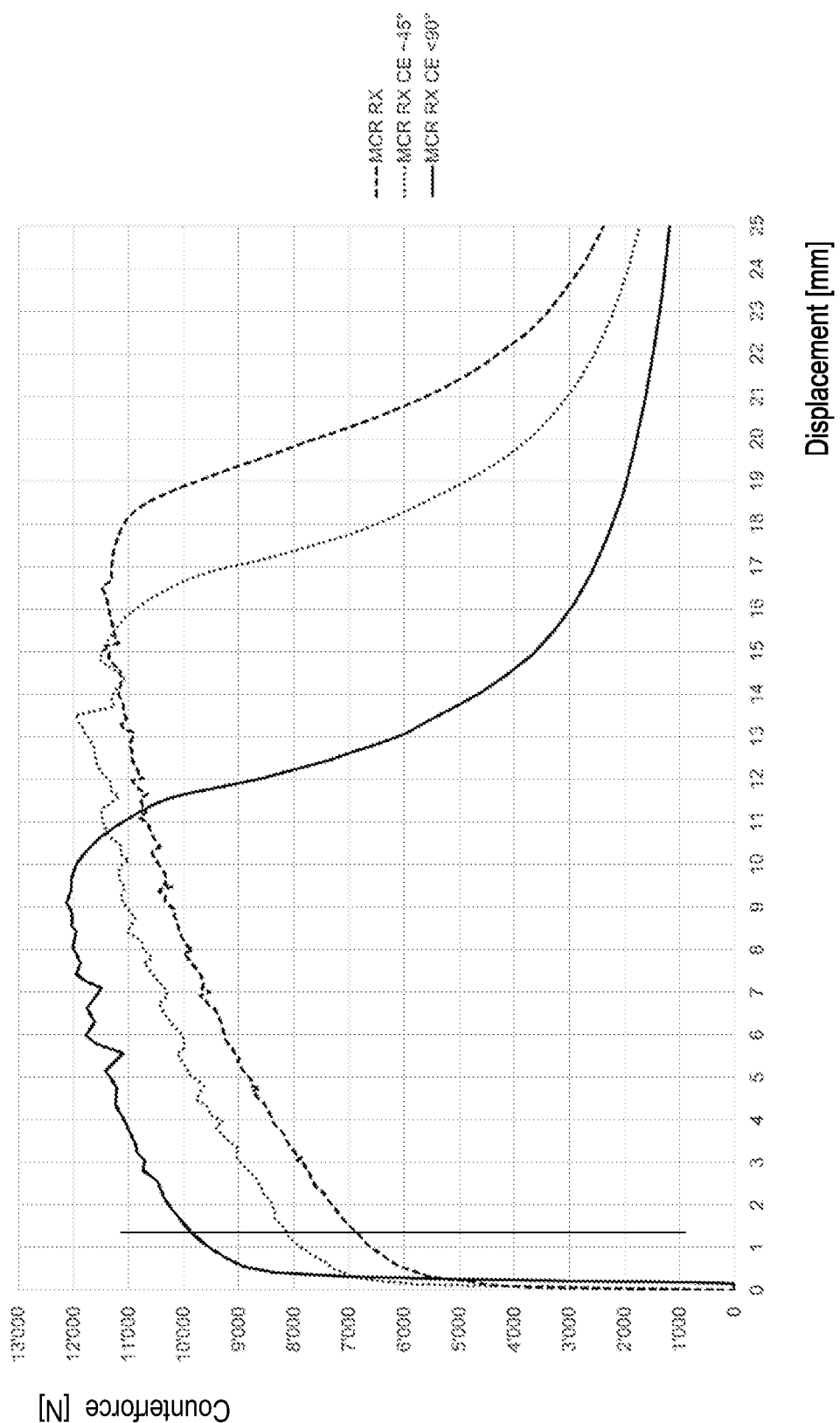

Embodiments of the invention are explained in greater detail below with reference to the drawings. Therein shows:

FIG. 1 an axial side view of a shrink-fit ring according to the invention with flanged peripheral edges, FIG. 2 an axial cross-sectional view along line A-A of FIG. 1, FIG. 3 a perspective view of the shrink-fit ring according to the invention, FIG. 4 a part X of FIG. 2 as an enlarged axial section and FIG. 5 a force-displacement diagram with the computer-based simulation result of the load behaviour of three shrink-fit rings.

EMBODIMENTS

The ring or collar shown in the drawing has a constant band thickness and is flanged radially outwards at its two circumferential edges 10 in such a way that the limbs 16 form an angle of approx. 70° to approx. 90° with the unflanged middle section 13. Angles of approx. 75° to approx. 85° are particularly preferred.

In the embodiment shown, the angle is about 80° and the substantially straight end faces 11 of the peripheral edges 10 run at an angle of about 10° to the ring axis 12. The ring centre section 13, which lies radially further inwards, ends on both sides with a rounded area 14.

The entire inner surface of the ring is free of edges with respect to the tube (not shown) it surrounds. The radial height of the outward flange is preferably such that the axial ends 15 of the inner ring section 13 are spaced from the tube even under heavy compression during the crimping operation. The middle section 13 runs continuously in the circumferential direction, without interruption by a buckle or the like.

Multi-crimp rings are used with sensitive hose materials, for example in the automotive industry in systems for air charging or cooling/heating. Due to the common hose tolerances, different compression rates occur—with higher values for large hose thicknesses and lower values for small hose thicknesses. Diameter tolerances in the pipe sockets increase this effect.

The assembly of the rings is usually path-dependent, i.e. the reduction of the ring diameter is set to a defined dimension. Due to the above-mentioned tolerances in hose thickness and pipe socket, there are therefore different compression rates. In other words, the compression rates cannot be set precisely, but they vary with the tolerances in the hose thickness and the socket diameter.

The invention reduces the risk of hose damage without impairing the performance. The compression rate generated by the ring in the non-flanged central area remains unchanged, while the flanged edge areas result in a smooth extension of the compressed hose, thus protecting the hose material.

Above all, however, the flanging of the circumferential edges 10 increases the intrinsic rigidity of the ring. The invention thus allows the use of thinner band material for the ring without having to accept a deterioration in the strength or dimensional rigidity of the ring in the radial direction. Tests have shown that a reduction of the band thickness by up to 20% is possible with the same rigidity, which leads to a corresponding saving of material.

In order to prevent the ring from buckling during shrinkage, an oversized band thickness had to be used compared to the actual required performance (tube compression). The required compression rates could also be achieved with smaller band thicknesses, but without flanging there would be a risk of the ring buckling during compression.

The improvement in the intrinsic stiffness of the shrink-fit ring due to the outward bending of the axial peripheral edges 10 was quantified by a computer simulation based on the finite element method. The results are illustrated in FIG. 5 and explained below.

Three multi-crimp rings (MCR) were examined, each made of a steel strip whose butt ends were butt-welded together (so-called "cross-welding" RX). The first ring (MCR RX) is not bent outwards at all at its circumferential edges, i.e. it is a simple ring with a homogeneous strip thickness and a constant diameter of approx. 40 mm in the axial direction. The second and the third ring each have outwardly curved peripheral edges ("curled edges" CE) and are otherwise identical to the first ring. The limb 16 on the axial circumferential edges 10 of the second ring (MCR RX CE~45°) extends at a set-up angle of approx. 45° to the unflanged middle section 13 of the ring. In the case of the third ring (MCR RX CE<90°), this set-up angle is approx. 85°.

The behaviour of the three rings was simulated with a so-called half-shell model. Here, the rings are placed one after the other around a disc which has approximately the diameter of the ring shrunk by crimping and which consists of two half-moon-shaped shells. The two half-shells are now moved in opposite directions in the simulation and a finite element analysis is used to calculate how the three rings behave in each case.

FIG. 5 shows the restoring force generated by the ring as a function of the displacement of the two half-shells. The restoring or counter force in Newtons, which is decisive for the strength of the ring, is shown as a function of the expansion of the ring diameter in millimetres, which is caused by the distance between the two half-shells. It can be seen that in the range of a diameter expansion of up to 10 mm, the third, strongly flanged ring "MCR RX CE<90°" produces a consistently higher counterforce than the second ring "MCR RX CE~45°", which is only flanged by approx. 45°, and this in turn produces a consistently higher counterforce than the first ring "MCR RX", which is not flanged. It should be noted that only the area with diameter expansions of up to approx. 1 mm is technically relevant. If the diameter expands more, the shrink-fit ring would lose the diameter reduction achieved by the crimping process, which is necessary for the sealing connection of the pipe socket and the hose by the shrink-fit ring.

If the values of the counterforce are compared with the value of 1 mm diameter expansion typically relevant in technical reality, a force of approx. 6,600 N is obtained for the first ring "MCR RX", a force of approx. 7,900 N for the second ring "MCR RX CE~45°" and a force of approx. 9,600 N for the third ring "MCR RX CE<90°". The counterforce against radial expansion and thus the strength of the third ring according to the embodiment of the present invention is thus improved by 45% compared to an unflanged ring and by still 20% compared to a ring flanged by only approx. 45°.

In summary, the present invention relates to a shrink-fit ring, the two circumferential edges 10 of which are flanged, and which makes it possible to use thinner band thicknesses without the risk of buckling owing to its greater intrinsic strength. The circumferential edges 10 end in limbs 16 which point radially outwards and enclose an angle of approx. 70° to 90° with an unflanged centre portion 13 of the ring that is located axially further inwards. The flanging results in an extension of the diameter of the ring edges, wherein the ring edge regions 14 are bent outwards in a rounded manner and the edge surfaces 11 run at an angle of preferably approx. 0° to approx. 20° with respect to the ring axis 12.

The invention claimed is:

1. A shrink-fit ring, comprising two axial circumferential edges (10) that are flanged, wherein the circumferential edges (10) end in radially outwardly pointing limbs (16) which extend at an angle of approximately 70° to 90° to a central section (13) of the ring which lies axially further inwards and is not flanged.

2. The shrink-fit ring according to claim 1, wherein the two axial circumferential edges (10) that are flanged result in a diameter expansion of the circumferential edges (10) over the entire ring circumference.

3. The shrink-fit ring according to claim 1, wherein the ring includes two edge regions (14), each of which lies between the central section (13) and one of the limbs (16), that are bent outwards in a rounded manner.

4. The shrink-fit ring according to claim 1, wherein the circumferential edges (10) each have one of a pair of axially outer end faces (11) that extend at an angle of approx. 0° to approx. 20° to a ring axis (12) of the ring.

5. The shrink-fit ring according to claim 1, having a substantially homogeneous band thickness over the entire ring width.

6. The shrink-fit ring according to claim 1, made from a steel strip having a pair of butt ends bent into a ring, with the butt ends butt-welded together.

7. The shrink-fit ring according to claim 1, which is designed to be slid over a hose in order to then press the hose in an area thereof which overlaps with a pipe socket by radial multi-crimping onto the pipe socket.

* * * * *